United States Patent [19]
Drees

[11] Patent Number: 5,267,897
[45] Date of Patent: Dec. 7, 1993

[54] METHOD AND APPARATUS FOR VENTILATION MEASUREMENT VIA CARBON DIOXIDE CONCENTRATION BALANCE

[75] Inventor: Kirk A. Drees, Cedarburg, Wis.

[73] Assignee: Johnson Service Company, Milwaukee, Wis.

[21] Appl. No.: 835,667

[22] Filed: Feb. 14, 1992

[51] Int. Cl.⁵ ............................................. F24F 11/00
[52] U.S. Cl. .................................... 454/229; 454/370; 73/861.04
[58] Field of Search ................ 454/228, 229, 239, 370; 73/16, 31.01, 31.02, 23.2, 861.04

[56] References Cited
U.S. PATENT DOCUMENTS 3,369,405  2/1968  Galegar .
4,051,731 10/1977  Bohl et al. ......................... 73/422 R
4,090,392  5/1978  Smith et al. ..................... 73/421.5 R
4,164,172  8/1979  Ahderfeon et al. .................. 454/229

FOREIGN PATENT DOCUMENTS 174231  6/1992  Japan ..................................... 454/229
174233  6/1992  Japan ..................................... 454/229

OTHER PUBLICATIONS

American Society of Heating, Refrigerating and Air-Conditioning Engineers, Inc. (Ashrae), Ashrae Standard 62-1989, Entitled "Ventilation for Acceptable Indoor Air Quality".

Primary Examiner—Harold Joyce
Attorney, Agent, or Firm—Foley & Lardner

[57] ABSTRACT

An apparatus and method indirectly determines the amount of outside air introduced into the ventilation system of a structure. Carbon dioxide concentrations are measured for return air, outside air and mixed air. The flow rate of mixed air is measured. The volume of outside air introduced into the system is determined without directly measuring the volume or flow rate of outside air. For calibrating the apparatus, a return air sensor is calibrated to the outside air and a mixed air sensor is calibrated to the outside air or the return air to eliminate inaccuracy due to sensor drift.

24 Claims, 4 Drawing Sheets

METHOD AND APPARATUS FOR VENTILATION MEASUREMENT VIA CARBON DIOXIDE CONCENTRATION BALANCE

BACKGROUND OF THE INVENTION

The present invention is generally directed to a method and apparatus for determining the flow rate of makeup fluid being utilized to circulate a mixed fluid of the makeup fluid and a return fluid within a volume. The present invention is more particularly directed to a method and apparatus for ventilation measurement via carbon dioxide concentration balance.

Indoor air quality is a topic which has recently gained increasing attention, for several reasons. In general, people today are much more aware of health issues. Media attention to issues such as asbestos health risks in older facilities has increased public awareness. In many facilities, budgetary controls have forced reductions in maintenance of air circulation and filtration systems.

Physical changes in occupied spaces have affected indoor air quality. Office and industrial spaces have been remodeled more frequently than in previous years, increasing the amount of airborne contaminants from construction materials, furniture and carpeting. Cubicle furniture systems have become more common. These systems can increase occupant density and can interfere with air distribution patterns within a space.

Buildings built today have less porous envelopes than older buildings. Thus, the ventilation which naturally occurred due to infiltration through the envelope has been significantly reduced.

Variable air volume (VAV) distribution systems also have become more popular because of lower operating costs. While VAV systems provide energy savings, at the same time they lower the room ventilation effectiveness. Room ventilation effectiveness relates to how well the supply air is distributed within the occupied space. Ventilation air which can not reach a portion of a space can not efficiently displace the contaminants from the space. The net effect of the lower ventilation rates and room ventilation effectiveness is an increase in space contaminant levels.

In extreme cases, Sick Building Syndrome and Building Related Illness have occurred. Sick Building Syndrome symptoms include headaches, dizziness, drowsiness, fatigue, nausea, and eye irritation. Most people experience relief shortly after exiting the "sick building." Building Related Illness is an even more serious problem. It refers to disease or infirmity resulting from exposure to indoor contaminants. It is characterized by clinical signs such as fevers or infections and prolonged recovery times. The aforementioned environmental and design changes and associated disorders have heightened attention to the problem of indoor air quality.

Indoor air quality is a function of many variables. These variables include the quality of outdoor air, the configuration of enclosed spaces, the design and maintenance of the ventilation system and the presence and strength of contaminant sources. A properly designed ventilation system must take into account all of these variables to maintain an acceptable level of indoor air quality.

There are many sources of space contaminants. Humans and their activities release a wide assortment of organic and inorganic chemicals. Personal care products, photocopy machines and other office equipment release chemicals. Growth of fungal material can release spores into the air. Standing water can allow harmful bacteria to multiply. Office furniture, partitions, paint, floor coverings and cleaning materials outgas chemicals into the air. Cracks in below-grade walls and floors can allow radon gas to enter the building. Lastly, the outdoor air itself can be a source of unwanted contaminants. This is particularly true for buildings located in large, congested metropolitan areas, or in cases where the outdoor air intake location is near loading docks, garages or near the building exhaust.

Building contaminant concentrations are a function of the amount of contaminant both entering and being generated in the space. If the contaminant concentrations in the outdoor air are negligible, then the contaminant levels in the space are inversely related to the ventilation rate and how well the air mixes within the space. Filtration can also be utilized to remove particulate contaminants from the air.

Most air source contaminants can be classified as one of the following: particulate matter, inorganic compounds, volatile organic compounds or microbes and their by-products. Particulate matter is generated by people, tobacco smoke, dust, cold water humidifiers or processes occurring inside the space. Airborne particle sizes can range from 0.01 micrometers to 100 micrometers. Particles smaller than 3.5 micrometers can penetrate into and possibly damage the lung. Depending on the size of the particle, concentrations may be reduced with either fibrous media or electrostatic attraction filtration.

Inorganic air contaminants include gases such as carbon dioxide, carbon monoxide, nitrogen dioxide, ozone or radon. Materials such as asbestos or fiberglass are inorganic particles.

Carbon dioxide is generated by the human respiratory process. The concentration level of carbon dioxide within a space can be used as an indication of the activity level and number of occupants within the space. The amount of carbon dioxide produced by an individual depends on the individual's diet and activity level. If carbon dioxide concentrations are below 1000 parts per million (ppm), the amount of ventilation air is generally considered adequate with regard to odor comfort.

Carbon monoxide is a by-product of combustion. It can enter a building if the outdoor intake is located near a garage or near a busy street. Unvented boilers, furnaces, clothes dryers or water heaters generate large levels of carbon monoxide. Combustion gases from these devices should always be vented to the outdoors. High levels of carbon monoxide can be lethal.

Nitrogen dioxide is produced by high temperature sources such as flames. Nitrogen dioxide is suspected to be a carcinogen. Local exhaust at the source is the most effective method for lowering nitrogen dioxide concentrations in a space.

Ozone is generated primarily by combination of solar radiation effecting the composition of combustion products (hydrocarbons) and by high voltage electrical equipment. In many metropolitan areas, large ozone concentrations may be present in the outdoor air. Photocopy machines and other equipment located inside a building also produce ozone. Ozone causes irritation, allergic reactions, and in some cases may make breathing difficult.

Radon is a naturally occurring radioactive gas contained in soil and ground water in some areas of the country. Lung cancer has been linked to radon exposure.

Asbestos is also an inorganic compound. Asbestos was a common insulating and building material until recently. Exposure to asbestos fibers has been linked to lung cancer. Fiberglass, another inorganic compound, can cause skin irritation, but at this time it has not been linked to any long term negative health effects.

Volatile organic compounds are generated by cleaning materials, personal care products, tobacco smoke, furniture, carpet, adhesives, paint and people. Exposure to volatile organic compounds can cause many symptoms such as headaches, dizziness, fatigue, nausea or eye irritation. If contaminant concentrations are high enough, long term negative health effects can occur. Reduction of volatile organic compound concentrations can be accomplished by dilution with outdoor air if it is of acceptable quality. Otherwise, activated carbon filters are generally used to remove volatile organic compounds from the air.

Providing acceptable indoor air quality requires a multi-disciplinary approach involving design professionals, contractors and maintenance and operating personnel. At the design level, architects and consulting engineers must provide a building layout and mechanical system design that can adequately control contaminants and provide acceptable temperature and humidity control at all load conditions. The design must adhere to applicable standards.

The American Society of Heating, Refrigerating and Air-Conditioning Engineers, Inc. (ASHRAE) has issued ASHRAE Standard 62-1989 regarding air quality for indoor spaces occupied by humans. ASHRAE Standard 62-1989 specifies minimum ventilation rates and indoor air quality that will be acceptable to human occupants and avoid adverse health affects. The standard applies to air quality in all indoor spaces that people may occupy.

Part of the design process for a ventilation system must include conformance with ASHRAE Standard 62-1989. This standard requires the measurement of the outdoor air flow rate to verify compliance with the ventilation rates specified within the standard.

One obvious solution for complying with the new ventilation rate requirements is to directly measure the outdoor air flow with a flow meter. Unfortunately, outdoor air flow rate is difficult to measure directly with accuracy.

Pitot tube type air flow stations are the most common type of air flow station. These stations sense the velocity pressure of the air as it passes through the station. The corresponding air velocity is related to the velocity pressure in a known manner. For measuring outdoor air flow, these flow stations would typically be installed near the outdoor air intake where the maximum air velocity is generally less than 500 ft/min. Outdoor air intakes are sized for such low velocities to prevent entrainment of rain, snow or dirt into the fresh air intakes. Unfortunately, manufacturers of pitot tube air flow stations generally specify low velocity sensing limits of 600-800 ft/min. so that the measurement error remains insignificant relative to the measurement signal. Thus, pitot tube air flow stations are unable to provide the required sensing accuracy when installed in a typical outdoor air intake configuration.

A less common type of air flow station utilizes heated thermistors to measure air flow. Such an air flow station uses a microprocessor to determine the air velocity as a function of the air stream temperature and the amount of power required to maintain the surface of the thermistor at a predetermined temperature. These stations are capable of accurately measuring air velocity below 500 ft/min. However, because of the high sensitivity at low air flow rates of these devices, low levels of turbulence can adversely affect the accuracy of the air flow measurement. Unfortunately, outdoor air intakes are typically very turbulent environments. Thus, thermal air flow stations are not a very good solution to the problem of directly measuring the outdoor air flow rate accurately.

Air flow rates can be measured by means of indirect, model-based techniques. These techniques utilize indirect measurements such as temperature to determine information about other variables. One possibility is a model based on energy balance and used to determine the outdoor air flow rate (CFMoa) based on the temperature of the outdoor air (Toa), temperature of return air (Tra), temperature of mixed air (Tma) as well as the mixed air flow rate (CFMma). This model is described by Equation 1.

$$CFM_{oa} = \left( \frac{Tra - Tma}{Tra - Toa} \right) \cdot CFM_{sa} \qquad \text{Equation 1}$$

Figure 1:
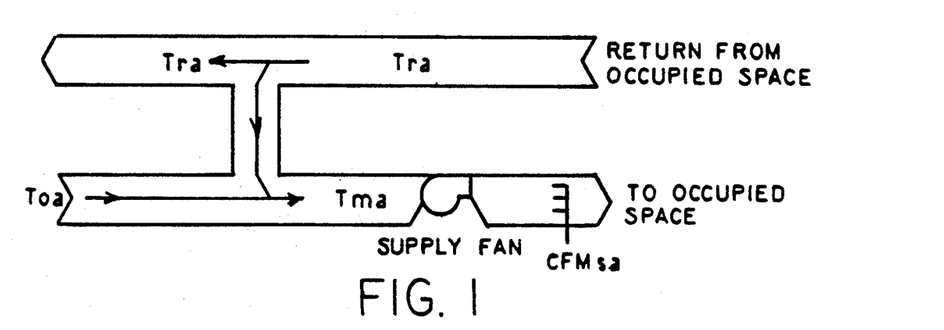
FIG. 1 shows a fan system layout indicating where transmitters which measure the quantities in Equation 1 would be located and provides a better understanding of the preferred embodiment of the present invention.

FIG. 1 shows a typical prior art fan system layout indicating where transmitters or sensors which measure the quantities in Equation 1 would be located. The ability of this model to provide an accurate measurement of the outdoor air flow rate depends on how accurately the temperatures and supply air flow rate can be measured. The most significant source of error in this model-based outdoor air flow calculator occurs when the difference between Tra and Toa becomes small. In that case, even a small error in either temperature reading can cause very large errors in the calculated outdoor air flow rate. Temperature sensing errors of ±1 degree Fahrenheit are the industry norm. Consequently, unacceptable errors will be calculated whenever the difference between the return and outdoor air temperatures is less than 10 degrees Fahrenheit. Most environments have significant time periods when the difference between the outdoor and return air temperatures are less than 10 degrees. Thus, a temperature based thermal energy balance is not an acceptable strategy for calculation of outdoor air flow rate.

The present invention provides a means for verifying compliance with the new ventilation standards which overcomes these limitations in direct measurement of outdoor air flow rate. The present invention provides an accurate, indirect method and apparatus for measuring the flow rate of outdoor, ventilation air as well as a method for calibrating the apparatus. The present invention finds particular application in a ventilation system for a structure which includes a supply duct for supplying mixed air to the structure, a return duct for extracting return air from the system, a recirculation duct for recirculating return air to the supply duct, and intake and exhaust ducts for admitting or venting air between the external environment and the ventilation system.

SUMMARY OF THE INVENTION

The present invention provides a method and apparatus for ventilation measurement via carbon dioxide concentration balance. The apparatus circulates mixed air comprising outside air and return air in a ventilation system of a structure. The apparatus determines the flow rate of outside or makeup air from the ratio of the difference between the $CO_2$ concentration of return air and the $CO_2$ concentration of supply air to the difference between the $CO_2$ concentration of return air and the $CO_2$ concentration of outside air. In addition, the $CO_2$ sensors may be automatically calibrated to ensure accurate and consistent measurement.

Accordingly, the invention provides a method and apparatus for determining the flow rate of makeup fluid being utilized to circulate a mixed fluid of the makeup fluid and a return fluid within a volume. The apparatus includes a first sensor means for sensing a component of the makeup fluid and for providing a first output indicative of the makeup fluid component. The apparatus further includes a second sensor means for sensing the same component of the return fluid and for providing a second output indicative of the return fluid component. The apparatus still further includes a third sensor means for sensing the same component of the supply fluid and for providing a third output indicative of the supply fluid component. The apparatus still further includes a circulation means for introducing the supply fluid into the volume. The apparatus still further includes a means for determining the flow rate of the makeup fluid from the ratio of the difference between the second output and the third output to the difference between the second output and the first output.

The invention further provides an apparatus for determining the flow rate of a first fluid introduced into a system for circulating a mixed fluid of a second fluid and a return fluid. The apparatus further includes a return fluid sensor means for measuring the same component of the return fluid in the system and producing a return fluid sensor means output. The apparatus still further includes a supply fluid sensor means for measuring the same component of the supply fluid and producing a supply fluid sensor means output. The invention still further includes a circulation means for circulating the second fluid in the volume. The invention still further includes a flow measurement means for measuring the flow rate of the second fluid. The invention still further includes a control means for determining the flow rate of the first fluid from the product of the flow rate of the second fluid and the ratio of the difference between the return fluid sensor means output and the supply fluid sensor means output to the difference between the return fluid sensor means output and the first fluid sensor means output.

The invention still further provides an apparatus for determining the flow rate of outside air introduced into a system for circulating in a structure mixed air comprising outside air and a portion of return air. The apparatus includes supply means coupled to the structure for introducing supply air into the structure. The apparatus further includes return means coupled to the structure for removing return air from the structure. The apparatus still further includes outside air sensor means coupled to the supply means for measuring a component of the outside air and producing an outside air sensor means output. The invention still further includes a return air sensor means coupled to the return means for measuring the same component of return air and producing a return air sensor means output and supply air sensor means coupled to the supply means for measuring the same component of supply air and producing a supply air sensor means output. The invention still further includes circulation means coupled to the supply means circulating the ventilation air in the structure and air flow means coupled to the supply means for measuring a supply air flow rate. The invention still further includes control means for determining the flow rate of outside air from the product of the ventilation air flow rate and the ratio of the difference between the return air sensor means output and the supply air sensor means output to the difference between the return air sensor means output and the outside air sensor means output.

The invention still further provides a method for determining the flow rate of outside air introduced into a system for circulating in a structure mixed air comprising outside air and return air. The method includes the steps of circulating supply air in the structure, removing return air from the structure and recirculating at least a portion of return air in the system. The method further includes the steps of measuring a concentration of a component in return air and producing a return air component concentration, measuring a concentration of the same component in outside air and producing an outside air component concentration, and measuring a concentration of the same component in supply air and producing a supply air component concentration. The method still further includes the step of determining the flow rate of outside air from the ratio of the difference between the return air component concentration and the supply air component concentration to the difference between the return air component concentration and the outside air component concentration.

The invention still further provides an apparatus for determining the flow rate of outside air introduced into a system for circulating in a structure mixed air comprising outside air and a portion of return air. The apparatus includes supply means coupled to the structure for introducing supply air into the structure and return means coupled to the structure for removing return air from the system. The apparatus still further includes outside air sensor means coupled to the supply means for measuring a component of outside air and producing an outside air sensor means output, return air sensor means coupled to said return means for measuring the same component of return air and producing a return air sensor means output, and a supply air sensor means coupled to the supply means for measuring the same component of supply air and producing a supply air sensor means output. The invention still further includes circulation means coupled to the supply means for circulating supply air in the system and air flow means coupled to the supply means for measuring a supply air flow rate. The apparatus further includes control means for determining the flow rate of outside air from the product of the supply air flow rate and the ratio of the difference between the return air sensor means output and the supply air sensor means output to the difference between the return air sensor means output and the outside air sensor means output. The apparatus still further includes recirculation control means coupled between the supply means and the return means and responsive to the control means for controlling the amount of return air circulated within the structure, and control means coupled to the supply means and responsive to the control means for controlling the introduction of outside air into the structure, the recirculation control means and the intake control means coacting to permit mixing of outside and return air to form supply air. The control means calibrates the supply air sensor means and the return air sensor means by opening the intake control means, closing the recirculation control means, calibrating the supply air sensor means to the outside air sensor means, closing the intake control means, opening the recirculation control means, and calibrating the return air sensor means to the supply air sensor means.

The invention still further provides a method for use, in an apparatus for controlling the amount of outside air introduced into a system for circulating supply air in a structure, the apparatus being of the type including intake control means, recirculation control means, outside air sensor means, return air sensor means and supply air sensor means. The method calibrates the supply air sensor means and the return air sensor means and includes the steps of opening the intake control means, closing the recirculation control means, calibrating the supply air sensor means to the outside air sensor means, closing the intake control means, opening the recirculation control means, and calibrating the return air sensor means to the supply air sensor means.

The invention still further provides an apparatus for determining the flow rate of outside air introduced into a system for circulating in a structure supply air comprising outside air and a portion of return air. The apparatus includes supply means coupled to the structure for introducing supply air into the structure. The apparatus further includes return means coupled to the structure for removing return air from the structure. The apparatus still further includes outside air sensor means coupled to the supply means for measuring a component of the outside air and producing an outside air sensor means output. The apparatus still further includes return air sensor means coupled to the return means for measuring the component of return air, the return air sensor means producing a return air sensor means output. The apparatus still further includes supply air sensor means coupled to the supply means for measuring the component of supply air and producing a supply air sensor means output. The apparatus still further includes circulation means coupled to the supply means for effecting circulation supply air in the structure. The apparatus still further includes air flow means coupled to the supply means for measuring a supply air flow rate. The invention still further includes control means for determining the flow rate of outside air from the product of said supply air flow rate and the ratio of the difference between the return air sensor means output and the mixed air sensor means output to the difference between the return air sensor means output and outside air sensor means output. The apparatus still further includes supply air valve means coupled to the supply means for controlling the flow of supply air or outside air to the supply air sensor means. The apparatus still further includes return air valve means coupled to said return means for controlling the flow of return air to the return air sensor means. The control means calibrates the supply air sensor means and the return air sensor means by configuring the supply air valve means to direct outside air to the supply air sensor means. The control means then calibrates said supply air sensor means. The control means then configures the supply air valve means to direct supply air to the supply air sensor means. The control means then configures the return air valve means to direct outside air to the return air sensor means, calibrates the return air sensor means, then configures the return air valve means to direct return air to the return air sensor means.

The invention further provides a method for use in an apparatus for controlling the amount of outside air introduced into a system for circulating ventilation air in a structure. The method includes the steps of configuring a supply air valve means to direct outside air to a supply air sensor, calibrating the supply air sensor, and configuring the supply air valve means to direct supply air to the supply air sensor. The method further includes the steps of configuring a return air valve means to direct outside air to a return air sensor means, calibrating the return air sensor means, and configuring the return air valve means to direct return air to the return air sensor means.

BRIEF DESCRIPTION OF THE DRAWINGS

The features of the present invention which are believed to be novel are set forth with particularity in the appended claims. The invention, together with further objects and advantages thereof, may best be understood by making reference to the following description taken in conjunction with the accompanying drawings in the several figures of which identical reference characters indicate identical elements and wherein:

DETAILED DESCRIPTION OF THE INVENTION

The amount of outdoor air which enters the mixed air plenum of a ventilation system can be calculated indirectly by applying a mass flow balance to the $CO_2$ concentration of the outdoor, return and supply air streams. This relationship is shown in Equation 2.

$$CFM_{oa} = \left( \frac{CO_{2ra} - CO_{2sa}}{CO_{2ra} - CO_{2oa}} \right) \cdot CFM_{sa} \qquad \text{Equation 2}$$

Figure 2:
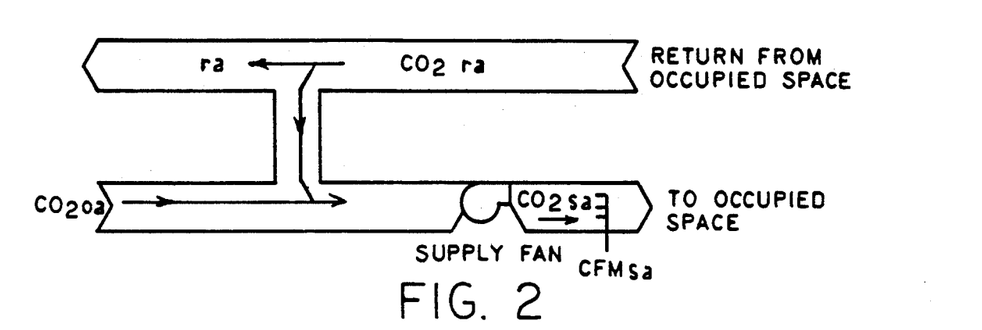
FIG. 2 shows a fan system layout indicating where transmitters which measure the quantities in Equation 2 would be located and provides a better understanding of the preferred embodiment of the present invention.

In Equation 2, $CFM_{oa}$ corresponds to the volume of outside air introduced into the ventilation system; $CO_{2ra}$ corresponds to the $CO_2$ concentration of return air in the return duct; $CO_{2sa}$ corresponds to the $CO_2$ concentration of supply air in the supply duct; $CO_{2oa}$ corresponds to the concentration of $CO_2$ in outside air;

and $CFM_{sa}$ corresponds to the flow rate of supply air in the supply duct. FIG. 2 shows a typical fan system layout indicating where sensors (transmitters) which measure the quantities in Equation 2 would be located.

In many installations, the exhaust air and outdoor air grilles are located in close proximity to one another. This can cause air to short cycle from the exhaust air outlet to the outdoor air inlet. When short cycling occurs, air entering the outdoor air inlet is a combination of fresh and recirculated air. Because current ventilation standards specify ventilation rates in terms of fresh outdoor air, not a combination of fresh and recirculated air, this complication must be considered in the model based control. This problem is illustrated in FIG. 3.

The following analysis describes how the $CO_2$ based model compensates for the problem of air short cycling from the building exhaust ($CO_2$ of exhaust air=$CO_{2rs}$) to the building outdoor air intake. The model also compensates for short cycling between the return and mixed air streams within the mechanical room. It should be noted that during actual field testing of the model based control, significant amounts of short cycling between these air streams was observed.

Figure 3:
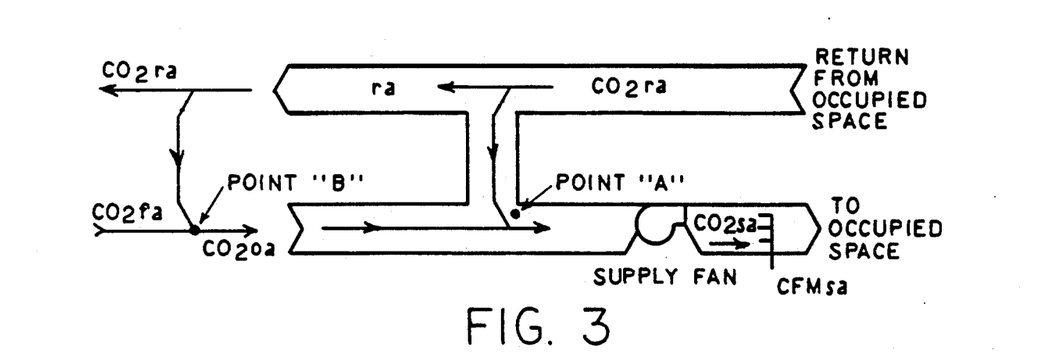
FIG. 3 shows a fan system layout indicating the problem of air short cycling from the building exhaust to the building outdoor air intake which problem is negated by the present invention.

If a $CO_2$ mass balance is performed at point A in FIG. 3, the relationship previously described in Equation 2 would result. If a $CO_2$ mass balance is performed at point B in FIG. 3, the relation shown in Equation 3 would result. This equation takes into consideration recirculation effects.

$$CFM_{fa} = \left( \frac{CO_{2ra} - CO_{2sa}}{CO_{2ra} - CO_{2fa}} \right) \cdot CFM_{oa} \quad \text{Equation 3}$$

If Equations 2 and 3 are combined and simplified, Equation 4 results.

$$CFM_{fa} = \left( \frac{CO_{2ra} - CO_{2sa}}{CO_{2ra} - CO_{2fa}} \right) \cdot CFM_{sa} \quad \text{Equation 4}$$

The amount of fresh air entering the building can be calculated via Equation 4. The percentage of fresh outdoor air entering the mixed air plenum can be calculated via Equation 5, below. It is significant to note that direct flow measurement techniques (air flow stations) are not able to detect or compensate for the effect of air short cycling between the exhaust and outdoor air streams or between the return and mixed air streams. Since the $CO_2$ concentration of fresh air is a relatively constant value in the range 370 to 440 ppm (depending on location), only two $CO_2$ measurements are required. These are $CO_{2rs}$ and $CO_{2sa}$.

$$\% FOA = \left( \frac{CO_{2fa} - CO_{2sa}}{CO_{2ra} - CO_{2fa}} \right) \quad \text{Equation 5}$$

Here, %FOA is the percentage of fresh outside air in the mixed air plenum.

Since the percentage of fresh outdoor air is equal to the ratio in Equation 5, the fresh outdoor air flow rate can be determined by multiplying this ratio by the supply air flow rate. This relationship is utilized in accordance with the present invention.

Figure 4:
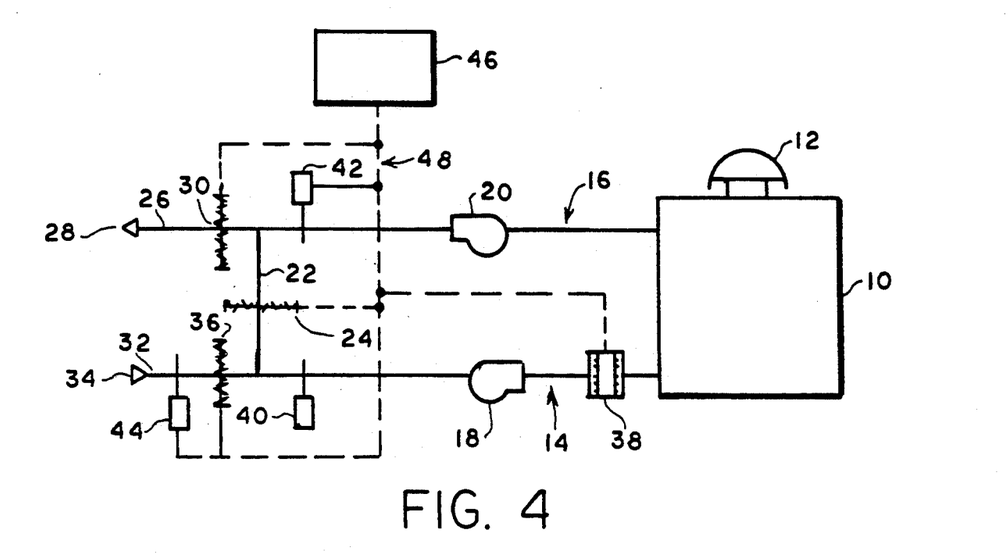
FIG. 4 is a schematic diagram illustrating the manner in which the present invention may be implemented in hardware form in accordance with a first preferred embodiment of the present invention.

FIG. 4 is a schematic diagram illustrating the manner in which the present invention may be implemented in hardware form in accordance with a first preferred embodiment of the present invention. FIG. 4 shows a structure 10 having a ventilation system. The ventilation system includes ductwork and other distribution media well known in the art. Structure 10 includes mechanical exhausts 12 by which ventilation air is exhausted from structure 10. For example, mechanical exhausts 12 may include kitchen and bathroom vent fans. Ventilation air in structure 10 may also exit structure 10 by exfiltration and enter structure 10 by infiltration. Exfiltration is air leakage outward through cracks and interstices and through ceilings, floors, and walls of a space or building. Infiltration is air leakage inward through cracks and interstices and through ceilings, floors, and walls of a space or building.

Coupled to structure 10 are supply duct 14 and return duct 16. Ventilation air in supply duct 14 is circulated into structure 10 by means of supply fan 18. Ventilation air in return duct 16 is extracted from structure 10 by means of return fan 20. Supply fan 18 and return fan 20 coact to circulate ventilation air in structure 10. While FIG. 4 indicates the presence of both supply fan 18 and return fan 20, it is to be noted that either fan operated alone could be sufficient to circulate ventilation air in structure 10.

Supply duct 14 and return duct 16 are preferably coupled by means of recirculation duct 22. Recirculation duct 22 preferably includes recirculation damper 24. When recirculation damper 24 is opened, recirculation duct 22 is substantially clear to allow air in return duct 16 to be recirculated into supply duct 14. When recirculation damper 24 is closed, recirculation duct 22 is substantially blocked to prevent the recirculation of return air.

Return duct 16 is preferably coupled to exhaust duct 26. Exhaust duct 26 leads to exhaust outlet 28, by which air in exhaust duct 26 is exhausted to the external environment. Exhaust duct 26 preferably includes exhaust damper 30. When exhaust damper 30 is opened, exhaust duct 26 is substantially clear to allow air in exhaust duct 26 to be exhausted through exhaust outlet 28. When exhaust damper 30 is closed, exhaust duct 26 is substantially closed to prevent air in exhaust duct 26 from being exhausted through exhaust outlet 28.

Supply duct 14 is coupled to outside duct 32. Outside duct 32 leads to outside inlet 34, by which outside air from the external environment is admitted to outside duct 32. Outside duct 32 preferably includes outside damper 36. When outside damper 36 is opened, outside duct 32 is substantially clear to allow outside air to be admitted to outside duct 32 through outside inlet 34. When outside damper 36 is closed, outside duct 32 is substantially closed to prevent outside air from being admitted into outside duct 32 through outside inlet 34.

Recirculation damper 24, exhaust damper 30 and outside damper 36 interact to permit the recirculation, exhaust and inlet of air in the ventilation system. When recirculation damper 24 is opened and exhaust damper 30 and outside damper 36 are both closed, return air in return duct 16 is recirculated to supply duct 14 and back to structure 10. When recirculation damper 24 is closed and exhaust damper 30 and outside damper 36 are both opened, substantially all return air in return duct 16 is exhausted to the external environment and supply duct 14 is substantially filled with outside air through outside inlet 34. When recirculation damper 24, outside damper 36 and exhaust damper 30 are proportionally opened, supply duct 14 is filled with mixed air comprising outside air from outside duct 32 and return air from recirculation duct 22.

Coupled to supply duct 14 is air flow station 38. Air flow station 38 is preferably a pitot tube or other device for measuring the flow rate of mixed air in supply duct 14. Air flow station 38 produces an output corresponding to the rate of flow of mixed air in supply duct 14.

Also coupled to supply duct 14 is mixed air sensor 40. Coupled to return duct 16 is return air sensor 42. Coupled to outside duct 32 is outside air sensor 44. Mixed air sensor 40, return air sensor 42 and outside air sensor 44 are preferably non-dispersive infra red or photo-acoustic $CO_2$ sensors which produce an output corresponding to the concentration of $CO_2$ in the air where the sensors are located.

Controller 46 is coupled to supply fan 18, return fan 20, recirculation damper 24, exhaust damper 30, outside damper 36, air flow station 38, mixed air sensor 40, return air sensor 42 and outside air sensor 44 by means of control bus 48. Controller 46 communicates control signals over control bus 48 to direct the operation of supply fan 18, return fan 20, recirculation damper 24, exhaust damper 30, and outside damper 36. In addition, controller 46 receives control signals over control bus 48 from air flow station 38, mixed air sensor 40, return air sensor 42 and outside air sensor 44.

Figure 5:
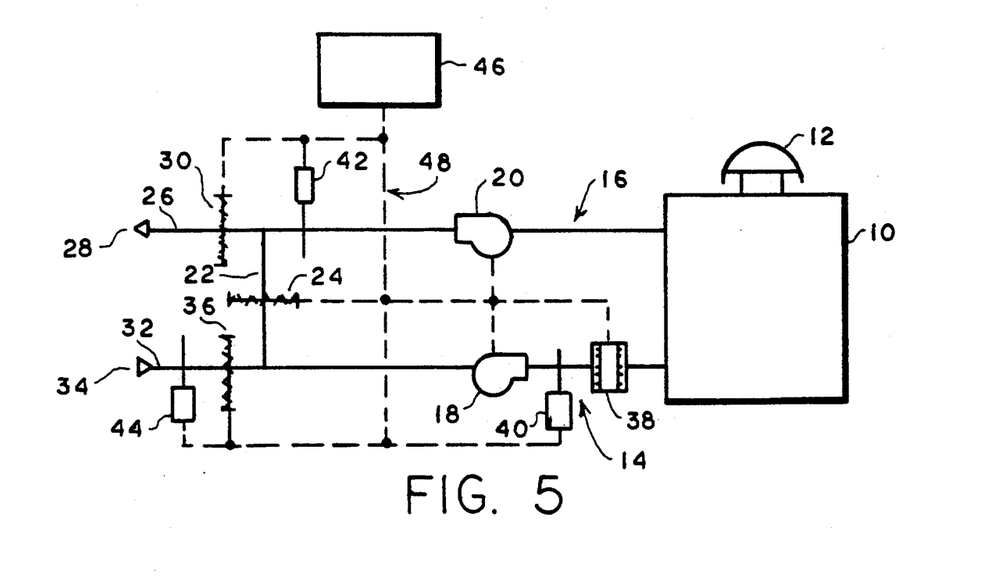
FIG. 5 is a schematic diagram illustrating the manner in which the present invention may be implemented in accordance with another preferred embodiment.

FIG. 5 is a schematic diagram illustrating the manner in which the present invention may be implemented in hardware form in accordance with a second preferred embodiment of the present invention. In FIG. 5, supply air sensor 40 is coupled to supply duct 14 between supply fan 18 and structure 10. The embodiment of the present invention shown in FIG. 5 may be preferred in situations where stratification of the mixed air in supply duct 14 may occur. When both recirculation damper 24 and outside damper 36 are open, the mixed air may not be well-mixed until it is a considerable distance downstream from the mixing point, and the mixed air becomes stratified.

Stratification of temperatures in supply ducts is well known, and because heat transport in gases occurs by kinetic energy transfer between gas molecules, stratification of $CO_2$ concentration is equally likely. Locating mixed air sensor 40 downstream of supply fan 18 reduces stratification of mixed air. The turbulence introduced by supply fan 18 and the additional time for diffusion to occur ensures homogeneous mixed air and an accurate measurement by mixed air sensor 40.

Figure 6:
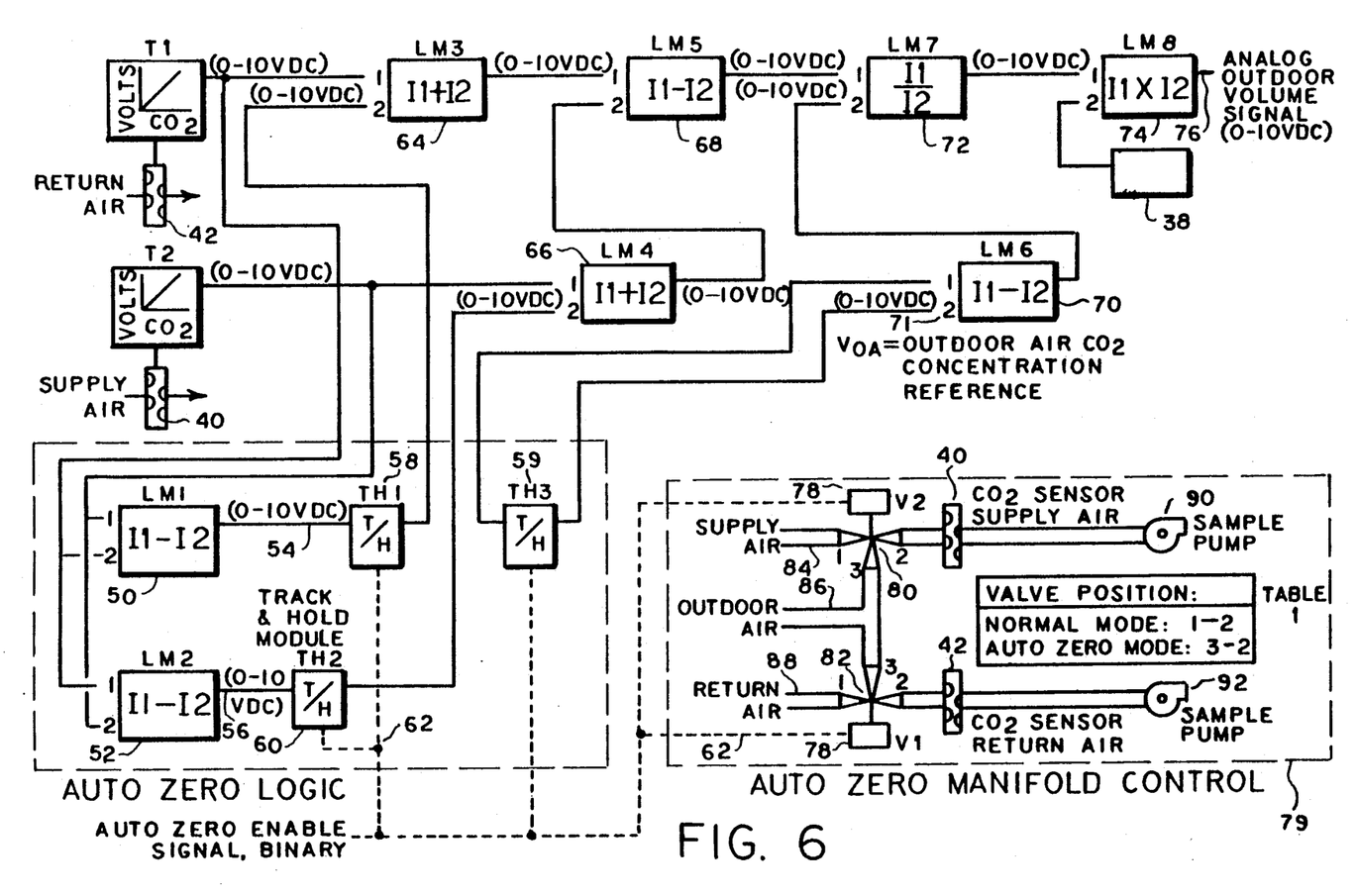
FIG. 6 is a schematic diagram illustrating the manner in which the present invention may be implemented in accordance with a preferred embodiment.

FIG. 6 is a schematic diagram illustrating the manner in which the control flow logic for the present invention may be implemented in accordance with a preferred embodiment. FIG. 6 shows the processing flow for both the auto-zeroing mode and the normal control mode which provides the determination described by Equation 4. In FIG. 6, supply air sensor 40 produces an output corresponding to the concentration of $CO_2$ in the supply air. Such output is preferably a DC voltage between 0 and 10 volts and directly proportional to the $CO_2$ concentration. This signal is appropriate for an embodiment of the present invention constructed of discrete components. If a microprocessor based embodiment were utilized, this and other similar outputs would be a voltage or current corresponding to $CO_2$ concentrations. Return air sensor 42 produces an output corresponding to the concentration of $CO_2$ in return air. Such output is preferably a DC voltage between 0 and 10 volts and directly proportional to the $CO_2$ concentration. Outside air sensor 44 produces an output corresponding to the concentration of $CO_2$ in outside air. Such output is preferably a DC voltage between 0 and 10 volts and directly proportional to the $CO_2$ concentration.

The outputs of supply air sensor 40 and return air sensor 42 are combined in a subtractor 50 and in another subtractor 52. Subtractor 50 produces a signal at output 54 indicative of the difference between the voltage levels at its inputs. Subtractor 52 similarly produces a signal at output 56 indicative of the difference between the voltage levels at its inputs. The output of subtractor 50 is held in a track and hold 58. The output of subtractor 52 is held in track and hold 60. In track and holds 58 and 60, the output signal tracks the input signal. When controller 46 asserts auto zero disenable signal 62, the respective inputs to track and holds 58 and 60 are "saved" and corresponding output signals from track and holds 58 and 60 are held constant. When controller 46 asserts auto zero enable signal 62, the outputs again track the respective inputs.

The outputs of sample and hold 58 and return air sensor 42 are combined in adder 64. The output of adder 64 is indicative of the sum of the voltages at its inputs. The output of adder 64 corresponds to the $CO_2$ concentration of return air.

The outputs of sample and hold 60 and supply air sensor 40 are combined in adder 66. The output of adder 66 is indicative of the sum of the voltages at its inputs. The output of adder 66 corresponds to the $CO_2$ concentration of supply air.

The outputs of adder 64 and adder 66 are combined in subtractor 68. The output of subtractor 68 is indicative of the difference between the voltages at its inputs. The output of subtractor 68 corresponds to the difference between the $CO_2$ concentration of return air and the $CO_2$ concentration of supply air. The output of subtractor 68 corresponds to the numerator of Equation 4.

The outputs of adder 64 and track and hold 59 are combined in subtractor 70. The output of subtractor 70 is indicative of the difference between the voltages at its inputs. The output of subtractor 70 corresponds to the difference between the $CO_2$ concentration of return air and the $CO_2$ concentration of outside air. The output of subtractor 70 corresponds to the denominator of Equation 4.

Because the $CO_2$ concentration of outside air is relatively constant, outside air sensor 44 may not be necessary. Thus, the $CO_2$ concentration of outside air need not be measured. Rather, it can be represented by a constant DC voltage equivalent to the value that would be measured by outside air sensor 44.

The output of subtractor 68 and the output of subtractor 70 are combined in divider 72. The output of divider 72 is indicative of the ratio of the voltages at its inputs. The output of divider 72 is indicative of the ratio of the output voltage of subtractor 68 to the output voltage of subtractor 70.

The output of divider 72 and the output of air flow station 38 are combined in multiplier 74. The output of multiplier 74 is indicative to the product of the voltages at its inputs. Output 76 of multiplier 74 corresponds to the product of the output voltage of divider 72 and the output voltage of air flow station 38. The voltage at output 76 represents the amount of fresh outdoor air entering structure 10, the quantity sought to be determined by the present invention and represented by Equation 4.

The $CO_2$ model described by Equation 4 is used to calculate the volume of fresh outdoor air which is provided via the fan system to structure 10. The accuracy of a model based calculator is directly related to how accurately the model inputs are measured.

Sensor accuracy is often specified as an inaccuracy in terms of the measured variable or span of the sensor. Accuracy specifications generally include combined offset, hysteresis, linearity, and other types of errors. A significant error source which can be corrected by field calibration is offset error. Offset error may comprise up to 67% of the total sensor error.

If the sensor offset error can be eliminated, accuracy can be substantially improved. In accordance with the present invention, the sensor offset error is corrected on an on-going basis without human intervention. To perform this task, the present invention incorporates an auto-zeroing function. Auto-zeroing eliminates offset error by adding a correction factor (bias) to the output of the sensors which measure the return or supply air $CO_2$ concentrations.

The auto-zero mode is initiated by controller 46. When auto-zero mode is initiated, air flow is redirected by auto-zero manifold control 79. In auto-zero manifold control 79, supply air sample tube 84 is coupled to supply duct 14. Outdoor air sample tube 86 is coupled to outside duct 32. Return air sample tube 88 is coupled to return duct 16. In normal operation, supply air valve 80 is configured so that supply air flows from supply air sample tube 84 to supply air sensor 40. Supply air sample pump 90 ensures a regular flow of air past supply air sensor 40. Also in normal operation, return air valve 82 is configured so that return air flows from return air sample tube 88 to return air sensor 42. Return air sample pump 92 ensures a regular flow of air past return air sensor 42. Table 1 shows appropriate valve positions for selecting between normal and auto-zero modes.

In auto-zero mode, controller 46 asserts auto zero enable signal 62, causing supply air valve 80 to be configured so that outdoor air flows from outdoor air sample tube 86 to supply air sensor 40. Similarly, when auto zero enable signal 62 is asserted, return air valve 82 is configured so that outdoor air flows from outdoor air sample tube 86 to return air sensor 42. In this manner, controller 46 calibrates supply air sensor 40 and return air sensor 42 to the $CO_2$ concentration of outside air.

Supply air valve 80 and return air valve 82 are actuated so that fresh outdoor air is transmitted to supply air sensor 40 and return air sensor 42. The outputs of track and holds 58, 59, and 60 are unlatched so that their outputs are allowed to track (match) their input signals. The auto-zero mode must be active long enough for the supply air and return air sensing lines to be completely purged and replaced by outdoor air. Also, supply air sensor 40 and return air sensor 42 must be given adequate time to come to equilibrium with the $CO_2$ concentration of fresh outdoor air. This process takes approximately 20 seconds to five minutes, depending on the installation and the type of $CO_2$ sensors.

The auto-zero mode of the present invention is used to eliminate offset error. During auto-zero mode, supply air sensor 40 and return air sensor 42 do not measure $CO_2$ in the supply and return air streams. Instead, they both measure $CO_2$ concentration of the fresh outdoor air stream. Their outputs thus are equal to the voltage associated with the $CO_2$ level of fresh outdoor air, approximately 370 ppm, plus the sensing error of each sensor, represented by epsilon ($\epsilon$). The output voltage of return air sensor 42 is equal to $CO_{2oa} = \epsilon_{ra}$. The output voltage of supply air sensor 40 is equal to $CO_{2oa} + \epsilon_{sa}$. Subtractor 50 and adder 64 determine the difference between the outputs of supply air sensor 40 and return air sensor 42. If the difference is positive, the value is passed through. If the difference is negative, a value of 0 is passed through. As an example, if the output of return air sensor 42 is 400 ppm and the output of supply air sensor 40 is 370 ppm, the output of subtractor 50 is 0. The output of subtractor 52 will be a voltage indication of the positive difference ($400 - 370 = 30$ ppm). Thus, the sensor with the lowest output should be biased upward by a voltage amount representing 30 ppm. Note that the difference in errors, $\epsilon_{ra} - \epsilon_{sa}$, is also equal to 30 ppm. Thus the offset error of return air sensor 42 relative to supply air sensor 40 will be eliminated by biasing the sensor with the lowest output (in this case, supply air sensor 40) by a voltage representing 30 ppm.

The actual biasing of the sensor outputs occurs in adders 64 and 66. Adder 64 allows return air sensor 42 to be biased. Adder 66 allows supply air sensor 40 to be biased. At any one time, only one of the two sensors will be biased. For this example, supply air sensor 40 is biased by a voltage representing 30 ppm.

At the same time as the relative error between return air sensor 42 and supply air sensor 40 is being eliminated, the output value of adder 64 is being passed through track and hold 59. As a result, all four input voltages to subtractors 68 and 70 become equal. In other words, the value of the biased outputs of return air sensor 42, supply air sensor 40 and input 71 of subtractor 70 (fresh outdoor air concentration reference) are all zeroed to the same reference. In this example, that reference is a voltage representing 400 ppm.

When the auto-zero mode is disabled, track and holds 58, 59, and 60 will clamp their respective outputs to the current value of their respective inputs. Under this example, then, the value of sample and hold 58 is clamped at a voltage representing 0 ppm, the value of sample and hold 59 is clamped at a voltage representing 400 ppm, and the value of sample and hold 60 is clamped at a voltage representing 30 ppm. These values will not change until the auto-zero mode is re-initialized. Supply air valve 80 and return air valve 82 are actuated so that supply air is transmitted to supply air sensor 40 and return air is transmitted to return air sensor 42. The system is then returned from its auto-zero mode to its normal mode.

In normal mode, the system determines the amount of fresh outdoor air being provided to the building in a manner corresponding to Equation 4. In FIG. 6, the generation of the voltage representing the numerator of Equation 4 is performed by subtractor 68. Generation of the voltage representing the denominator is performed by subtractor 70. The ratio of numerator voltage to denominator voltage is taken by divider 72. This ratio is multiplied by the air flow rate by multiplier 74.

Hence, in accordance with the present invention, no field calibration is required to commission the $CO_2$ calculator since the model described by Equation 4 is based on differences between $CO_2$ concentrations rather than actual $CO_2$ concentrations. Since the auto-zero mode calibrates all of the $CO_2$ model inputs to the same reference, it can very accurately determine differences between inputs without knowing what the actual $CO_2$ concentrations are. Thus, there is no need to field calibrate the $CO_2$ inputs because the model doesn't require knowledge of actual $CO_2$ concentrations. Only differences are important, and they are automatically compensated for by the auto-zeroing.

This relationship may be verified by the following analysis. The output of any sensor is equal to the actual value of the sensed property plus some amount of error, $\epsilon$. The output of supply air sensor 40 therefore represents $CO_{2sa}+\epsilon_{sa}$. The output of return air sensor 42 is therefore represents $CO_{2ra}+\epsilon_{ra}$. Subtractors 50 and 52 are used to determine how much the lower sensor output should be biased. Assuming that the output of return air sensor 42 is greater than the output of supply air sensor 40, and keeping in mind that $CO_{2ra}=CO_{2sa}=CO_{2fa}$ during auto-zero enable mode, then $$\text{output of subtractors 50} = 0$$
$$\text{output of subtractor 52} = (CO_{2ra} + \epsilon_{ra}) - (CO_{2sa} + \epsilon_{sa})$$
$$= (\epsilon_{ra} - \epsilon_{sa})$$

Adders 64 and 66 add the bias to the original sensor outputs:

$$\text{output of adder 64} = (CO_{2ra} + \epsilon_{ra})$$
$$\text{output of adder 66} = (CO_{2sa} + \epsilon_{sa}) + (\epsilon_{ra} - \epsilon_{sa})$$
$$= (CO_{2sa} + \epsilon_{ra})$$

Subtractors 68 and 70, divider 72 and multiplier 74 determine the actual amount of fresh outdoor air being provided to the building. With reference to Equation 4, subtractor 68 determines the difference used in the numerator and subtractor 70 determines the difference used in the denominator:

$$\text{output of subtractor 68} = (CO_{2ra} + \epsilon_{ra}) - (CO_{2sa} + \epsilon_{ra})$$
$$= (CO_{2ra} - CO_{2sa})$$
$$\text{output of subtractor 70} = (CO_{2ra} + \epsilon_{ra}) - (CO_{2ra} + \epsilon_{ra})$$
$$= 0$$

Because sample and hold 59 clamps the fresh outdoor air $CO_2$ reference during auto-zero mode, the value of $CO_{2ra}$ in the subtrahend of the equation for the output of subtractor 70 is actually $CO_{2fa}$. If this substitution is made, $$\text{output of subtractor 70} = (CO_{2ra} + \epsilon_{ra}) - (CO_{2fa} + \epsilon_{ra})$$
$$= (CO_{2ra} - CO_{2fa})$$

Divider 72 determines the ratio of the outputs of subtractors 68 and 70. This result is equal to the decimal percentage of the supply air which is comprised of fresh outdoor air:

$$\text{output of divider 72} = \left( \frac{CO_{2ra} - CO_{2sa}}{CO_{2ra} - CO_{2fa}} \right)$$

Multiplier 74 multiplies the result of divider 72 by the input signal for air flow station 38. The output of multiplier 74 is the fresh outdoor air flow rate:

$$\text{output of multiplier 74} = \left( \frac{CO_{2ra} - CO_{2sa}}{CO_{2ra} - CO_{2fa}} \right) \cdot CFM_{sa}$$

This result is exactly equal to Equation 4. Note that all sensor errors are canceled out. Also, knowing actual $CO_2$ concentrations is not important. Only the differences in $CO_2$ concentrations are germane to the results of the actual calculation.

When implemented in a microprocessor, the outputs of supply air sensor 40 and return air sensor 42 are preferably biased to match the $CO_2$ concentration of outdoor air. Thus, the absolute accuracy would also be substantially increased along with the relative accuracy.

In accordance with the present invention, less hardware is required implement than prior art systems. Because the $CO_2$ level of the outdoor air is a constant value in the range 370 to 440 ppm, knowledge of the $CO_2$ concentration of the fresh outdoor air is not required to calculate the volume of the fresh outdoor air which enters the building. The auto-zeroing function assures accuracy by eliminating the relative error between the $CO_2$ sensors. In the case of a temperature based energy balance model, the outdoor air temperature must be measured since it is not constant. The necessity of measuring this additional input also creates an additional source of measurement error which will adversely affect the result of the energy balance.

Sensor placement is also simple and trouble free, particularly when compared to systems which utilize a temperature based model. Because heating and cooling coils, humidifiers and other equipment do not affect the $CO_2$ level of an air stream, the $CO_2$ sensors can be located in any convenient and easily accessible section of the supply or return ducts. In contrast, the temperature elements for a system utilizing an energy based model must typically be located at or near the mixed air plenum before the air is allowed to flow through any type of coil. As a result, stratification of air streams can cause significant temperature sensing errors.

Systems structured in accordance with the present invention do not require any special or extraordinary requirements for the layout and design of the outdoor air intake duct work or mixing plenum. Thus, the construction costs of a mechanical system incorporating the present invention will not be affected. In comparison, to achieve comparable accuracy with any direct flow sensing technology, extraordinary design and installation practices must be incorporated into the design of the outdoor air ductwork and mixing plenum.

Carbon dioxide concentration is the preferred component of ventilation air for measurement. $CO_2$ sensors are readily and commercially available. $CO_2$ concentrations are sufficiently high to ensure an accurate measurement regardless of the outdoor air temperature or any other independent variable. The $CO_2$ concentration of fresh outdoor is relatively constant in the range of 370 to 440 ppm compared to the variable $CO_2$ concentration of return air which is typically between 500 and 1000 ppm. However, the present invention is not limited to measurement of $CO_2$ concentration. The relationship of Equation 4 is equally valid for other components of ventilation air.

The approach of using a $CO_2$ balance to determine the outdoor flow rate is superior to a temperature-based energy balance strategy. The difference in $CO_2$ levels typically encountered in the outdoor, return and supply air streams is large enough so that reasonable accuracy may be provided.

The $CO_2$ model based system of FIG. 6 is also fault tolerant. If the $CO_2$ level of the return air approached the $CO_2$ level of the fresh outdoor air, the space would most likely be sparsely occupied, since the occupants themselves generate the $CO_2$. Therefore, any associated calculation errors become less significant because the ventilation codes are based on occupant density.

In a first alternative embodiment, auto-zeroing could be implemented in a microprocessor based digital controller. This embodiment would allow reduced cost and increased reliability. In such a microprocessor embodiment, the outputs of supply air sensor 40 and return air sensor 42 would be biased to match the $CO_2$ concentration of fresh outdoor air during the auto-zeroing operation. This provides the additional benefit of recalibration to a known reference which will increase the accuracy of the absolute measurement of the $CO_2$ concentrations. Even though a high degree of absolute accuracy is not required for implementation, it may be preferable to know the actual concentrations in addition to the relative differences between $CO_2$ concentrations which are used.

Figure 7:
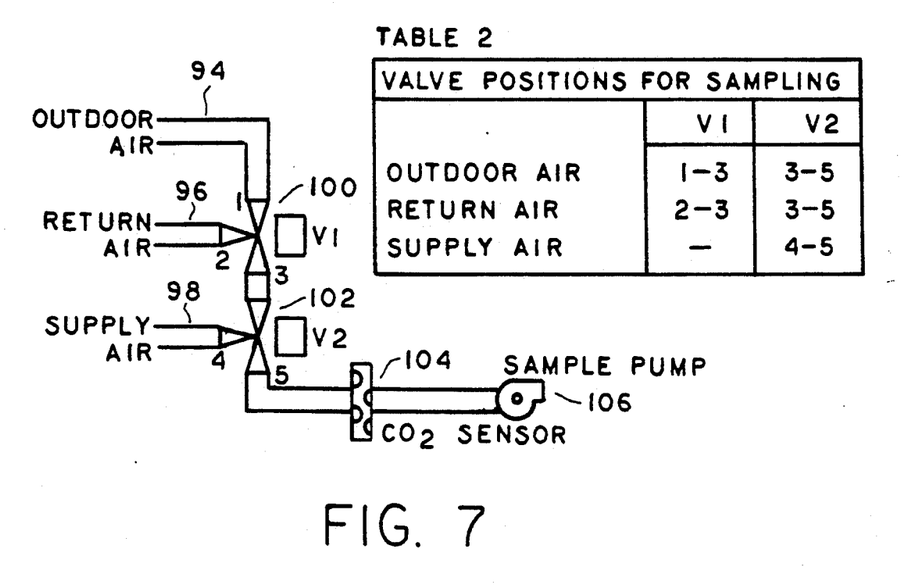
FIG. 7 is a schematic diagram illustrating the manner in which the present inventions may be implemented in accordance with an alternative preferred embodiment.

FIG. 7 is a schematic diagram illustrating the manner in which the present invention may be implemented in accordance with a first alternative preferred embodiment. FIG. 7 shows the technique of error elimination via sensor multiplexing. This error elimination technique involves using a manifold with two switching valves to continually switch either fresh outdoor, return, or supply air through a single CO, sensor.

In the first alternative preferred embodiment, the elements shown in FIG. 7 replace auto-zero manifold control 79 in FIG. 6. In FIG. 7, outdoor air sample tube 94 is coupled to outside duct 32. Return air sample tube 96 is coupled to return duct 16. Supply air sample tube 98 is coupled to supply duct 14. Table 2 shows appropriate valve positions for transmitting outdoor, return and supply air to $CO_2$ sensor 104. Under the direction of controller 46, the appropriate air source is coupled to $CO_2$ sensor 104 for one to five minutes to allow time for the sensing lines to be purged and the sensor to settle out. Each air source is sequentially coupled to $CO_2$ sensor 104.

Since, in the first alternative preferred embodiment, a single $CO_2$ sensor is used, the bias, sensitivity and linearity sensor errors between all three $CO_2$ readings are the same. Since differences between inputs are evaluated, these errors will cancel each other out. Thus, very accurate relative differences between $CO_2$ readings are possible, which in turn provides for very accurate determinations of fresh outdoor air flow. The disadvantages of the first alternative preferred embodiment are slower response times for generating outputs because sufficient time must be allowed for $CO_2$ sensor 104 to sense all three $CO_2$ concentrations. Also, the first alternative preferred embodiment will not ensure absolute accuracy of the measured $CO_2$ concentrations because the sensors are not zeroed to a fixed known reference. In some installations, these disadvantages may be negligible.

A second alternative preferred embodiment combines the auto-zeroing and the sensor multiplexing error elimination techniques. Sensor multiplexing offers slightly better accuracy since it negates the effect of bias, sensitivity and linearity sensor errors. Auto-zeroing can be used to increase the absolute sensor accuracy since it allows for the $CO_2$ sensor or sensors to be calibrated against a known reference, namely the $CO_2$ concentration of fresh air. The auto-zeroing is performed under the direction of controller 46 on an adjustable periodic basis which coincides with the manifold being indexed to provide fresh outdoor air to the $CO_2$ sensor. During auto-zeroing, the signal of the $CO_2$ sensor is biased by a fixed amount to provide an output which is equal to the $CO_2$ concentration of the known fresh outdoor air reference. The second alternative preferred embodiment of the present invention provides accurate relative $CO_2$ differences as well as allows accurate indications of absolute $CO_2$ concentrations of the fresh outdoor, return and supply air streams.

From the foregoing, it can be seen that the present invention provides a method and apparatus for indirectly measuring the amount of fresh outside air introduced into a system for circulating ventilation air in a structure.

While particular embodiments of the present invention have been shown and described, modifications may be made, and it is therefore intended in the appended claims to cover all such changes and modifications which fall within the true spirit and scope of the invention.

I claim:

1. An apparatus for determining the flow rate of supply fluid being utilized to circulate a mixed fluid of said supply fluid and a return fluid within a volume, said apparatus comprising:
   first sensor means for sensing a component of said supply fluid and for providing a first output indicative of said supply fluid component;
   second sensor means for sensing said component of said return fluid and for providing a second output indicative of said return fluid component;
   third sensor means for sensing said component of said mixed fluid and for providing a third output indicative of said mixed fluid component;
   circulation means for effecting introduction of said mixed fluid into said volume; and
   means for determining said flow rate of said supply fluid being utilized from the ratio of the difference between said second output and said third output to the difference between said second output and said first output.

2. A system as defined in claim 1 further including fourth sensing means for sensing the flow rate of said mixed fluid into said volume and producing a fourth output indicative of said flow rate of said mixed fluid wherein said means for determining said flow rate determines said flow rate from the product of said fourth output and said ratio.

3. An apparatus for determining the flow rate of a first fluid introduced into a system for circulating a mixed fluid of a second fluid and a return fluid within a volume, the apparatus comprising:
   first fluid sensor means for measuring a component of said first fluid and producing a first fluid sensor means output;
   return fluid sensor means for measuring said component of said return fluid in said system, said return fluid sensor means producing a return fluid sensor means output;
   mixed fluid sensor means for measuring said component of a mixed fluid, said mixed fluid sensor means producing a mixed fluid sensor means output;

circulation means for effecting circulation of said second fluid in said volume;

flow measurement means for measuring the flow rate of said second fluid; and control means for determining said flow rate from the product of said flow rate of said second fluid and the ratio of the difference between said return fluid sensor means output and said mixed fluid sensor means output to the difference between said return fluid sensor means output and said first fluid sensor means output.

4. An apparatus as defined in claim 3 further comprising recirculation control means responsive to said control means for controlling the amount of said return fluid recirculated within said volume, and intake control means responsive to said control means for controlling the introduction of said second fluid into said volume.

5. An apparatus for determining the flow rate of outside air introduced into a system for circulating in a structure supply air comprising said outside air and a portion of return air, the apparatus comprising:

supply means coupled to said structure for introducing said supply air into said structure;

return means coupled to said structure for removing said return air from said structure;

outside air sensor means coupled to said supply means for measuring a component of said outside air and producing an outside air sensor means output;

return air sensor means coupled to said return means for measuring said component of return air, said return air sensor means producing a return air sensor means output;

supply air sensor means coupled to said supply means for measuring said component of supply air, said supply air sensor means producing a supply air sensor means output;

circulation means coupled to said supply means for effecting circulation of said supply air in said structure;

air flow means coupled to said supply means for measuring a ventilation air flow rate; and control means for determining said flow rate of outside air from the product of said ventilation air flow rate and the ratio of the difference between said return air sensor means output and said supply air sensor means output to the difference between said return air sensor means output and said outside air sensor means output.

6. An apparatus as defined in claim 5 further comprising recirculation control means coupled between said supply means and said return means and responsive to said control means for controlling the amount of said return air recirculated within said volume, and intake control means coupled to said supply means and responsive to said control means for controlling the introduction of said outside air into said volume, said recirculation control means and said intake control means coacting to permit mixing of said outside air and said return air to form said supply air.

7. An apparatus as defined in claim 5 wherein said component comprises carbon dioxide.

8. An apparatus as defined in claim 6 further comprising exhaust means coupled to said return means for controlling the amount of said return air exhausted from said system.

9. An apparatus as recited in claim 6 wherein said circulation means comprises a supply fan for forcing said supply air into said system.

10. An apparatus as defined in claim 9 wherein said supply air sensor means is coupled between said recirculation control means and said supply fan.

11. An apparatus as recited in claim 9 wherein said supply air sensor means is coupled between said supply fan and said structure.

12. An apparatus as recited in claim 9 further comprising return fan means coupled to said return means for extracting said return air from said structure.

13. A method for determining the flow rate of outside air introduced into a system for circulating in a structure supply air comprising said outside air and return air, the method comprising the steps of:

circulating said supply air in said structure;

removing said return air from said structure;

recirculating at least a portion of said return air in said system;

measuring a concentration of a component in said return air and producing a return air component concentration;

measuring a concentration of said component in said outside air and producing an outside air component concentration;

measuring a concentration of said component in said supply air and producing a supply air component concentration;

determining said flow rate of outside air from the ratio of the difference between said return air component concentration and said supply air component concentration to the difference between said return air component concentration and said outside air component concentration.

14. A method as defined in claim 13 including the further steps of measuring the rate of flow of said supply air into said system and producing a supply air flow rate and determining said flow rate of said outside air from the product of said supply air flow rate and said ratio.

15. A method as defined in claim 14 wherein said component is carbon dioxide.

16. A method as defined in claim 14 further including the steps of providing recirculation control means for controlling the amount of said return air recirculated in said system; providing circulation means for circulating said supply air in said system; and providing sensor means for measuring said concentration of said component in said supply air and producing said supply air component concentration and locating said sensor means between said recirculation control means and said circulation means.

17. A method as defined in claim 14 further including the steps of providing a circulation means for circulating said supply air in said system, providing sensor means for measuring said concentration of said component in said supply air, producing said supply air component concentration, and locating said sensor means between said circulation means and said structure.

18. An apparatus for determining the flow rate of outside air introduced into a system for circulating in a structure supply air comprising said outside air and a portion of return air, the apparatus comprising:

supply means coupled to said structure for introducing said supply air into said structure;

return means coupled to said structure for removing said return air from said structure;

outside air sensor means coupled to said supply means for measuring a component of said outside air and producing an outside air sensor means output;

return air sensor means coupled to said return means for measuring said component of return air, said return air sensor means producing a return air sensor means output;

supply air sensor means coupled to said supply means for measuring said component of supply air, said supply air sensor means producing a supply air sensor means output;

circulation means coupled to said supply means for effecting circulation of said supply air in said structure;

air flow means coupled to said supply means for measuring a supply air flow rate;

control means for determining said flow rate of outside air from the product of said supply air flow rate and the ratio of the difference between said return air sensor means output and said supply air sensor means output to the difference between said return air sensor means output and said outside air sensor means output;

recirculation control means coupled between said supply means and said return means and responsive to said control means for controlling the amount of said return air recirculated within said structure;

intake control means coupled to said supply means and responsive to said control means for controlling the introduction of said outside air into said structure, said recirculation control means and said intake control means coacting to permit mixing of said outside air and said return air to form said supply air;

wherein said control means calibrates said supply air sensor means and said return air sensor means by opening said intake control means; closing said recirculation control means; calibrating said supply air sensor means to said outside air sensor means; closing said intake control means; opening said recirculation control means; and calibrating said return air sensor means to said supply air sensor means.

19. An apparatus for determining the flow rate of outside air introduced into a system for circulating in a structure supply air comprising said outside air and a portion of return air, the apparatus comprising:

supply means coupled to said structure for introducing said supply air into said structure;

return means coupled to said structure for removing said return air from said structure;

outside air sensor means coupled to said supply means for measuring a component of said outside air and producing an outside air sensor means output;

return air sensor means coupled to said return means for measuring said component of return air, said return air sensor means producing a return air sensor means output;

supply air sensor means coupled to said supply means for measuring said component of supply air, said supply air sensor means producing a supply air sensor means output;

circulation means coupled to said supply means for effecting circulation of said supply air in said structure;

air flow means coupled to said supply means for measuring a supply air flow rate;

control means for determining said flow rate of outside air from the product of said supply air flow rate and the ratio of the difference between said return air sensor means output and said supply air sensor means output to the difference between said return air sensor means output and said outside air sensor means output;

supply air valve means coupled to said supply means for controlling the flow of said supply air or said outside air to said supply air sensor means;

return air valve means coupled to said return means for controlling the flow of said return air or said outside air to said return air sensor means;

wherein said control means calibrates said supply air sensor means and said return air sensor means by configuring said supply air valve means to direct said outside air to said supply air sensor means; calibrating said supply air sensor means; configuring said supply air valve means to direct said supply air to said supply air sensor means; configuring said return air valve means to direct said outside air to said return air sensor means; calibrating said return air sensor means; and configuring said return air valve means to direct said return air to said return air sensor means.

20. A method for use in an apparatus for controlling the amount of outside air introduced into a system for circulating ventilation air in a structure, said apparatus comprising intake control means, recirculation control means, outside air sensor means, return air sensor means and supply air sensor means, said method for calibrating said supply air sensor means and said return air sensor means and comprising the steps of:

opening said intake control means;
closing said recirculation control means;
calibrating said supply air sensor means to said outside air sensor means;
closing said intake control means;
opening said recirculation control means; and
calibrating said return air sensor means to said supply air sensor means.

21. A method for use in an apparatus for controlling the amount of outside air introduced into a system for circulating ventilation air in a structure, said apparatus comprising return air sensor means, supply air sensor means, supply air valve means and return air valve means, said method for calibrating said supply air sensor means and said return air sensor means and comprising the steps of:

configuring said supply air valve means to direct said outside air to said supply air sensor means;
calibrating said supply air sensor means;
configuring said supply air valve means to direct said supply air to said supply air sensor means;
configuring said return air valve means to direct said outside air to said return air sensor means;
calibrating said return air sensor means; and
configuring said return air valve means to direct said return air to said return air sensor means.

22. An apparatus for determining the flow rate of outside air introduced into a system for circulating in a structure supply air comprising said outside air and a portion of return air, the apparatus comprising:

supply means coupled to said structure for introducing said supply air into said structure;
return means coupled to said structure for removing said return air from said structure;
outside air sensor means coupled to said supply means for measuring a component of said outside air and producing an outside air sensor means output;

return air sensor means coupled to said return means for measuring said component of return air, said return air sensor means producing a return air sensor means output;

supply air sensor means coupled to said supply means for measuring said component of supply air, said supply air sensor means producing a supply air sensor means output;

circulation means coupled to said supply means for effecting circulation of said supply air in said structure;

air flow means coupled to said supply means for measuring a supply air flow rate;

control means for determining said flow rate of outside air from the product of said supply air flow rate and the ratio of the difference between said return air sensor means output and said supply air sensor means output to the difference between said return air sensor means output and said outside air sensor means output;

supply air valve means coupled to said supply means for controlling the flow of said supply air or said outside air to said supply air sensor means;

return air valve means coupled to said return means for controlling the flow of said return air or said outside air to said return air sensor means;

wherein said control means calibrates said supply air sensor means and said return air sensor means by subtracting said return air sensor means output from said supply air sensor means output to produce an offset and adding said offset to the smaller of said return air sensor means output and said supply air sensor means output.

23. An apparatus for determining the flow rate of outside air introduced into a system for circulating in a structure supply air comprising said outside air and a portion of return air, the apparatus comprising:

supply means coupled to said structure for introducing said supply air into said structure;

return means coupled to said structure for removing said return air from said structure;

circulation means coupled to said supply means for effecting circulation of said supply air in said structure;

air flow means coupled to said supply means for measuring a supply air flow rate;

return air sample means coupled to said return means for sampling said return air;

supply air sample means coupled to said supply means for sampling said supply air;

outside air sample means coupled to said supply means for sampling said outside air;

valve means coupled to said return air sample means, said supply air sample means, said outside air sample means and said air sensor means for selecting one of said return air or said supply air or said outside air as air to be sampled;

air sensor means coupled to said valve means for measuring a component of said air to be sampled and producing an output;

control means for directing said valve means to select said return air and storing the output of said air sensor means as a return air sensor means output, directing said valve means to select said supply air and storing the output of said air sensor means as a supply air sensor means output, directing said valve means to select said outside air and storing the output of said air sensor means as an outside air sensor means output, determining said flow rate of outside air from the product of said ventilation air flow rate and the ratio of the difference between said return air sensor means output and said supply air sensor means output to the difference between said return air sensor means output and said outside air sensor means output.

24. An apparatus for determining the flow rate of outside air introduced into a system for circulating in a structure supply air comprising said outside air and a portion of return air, the apparatus comprising:

supply means coupled to said structure for introducing said supply air into said structure;

return means coupled to said structure for removing said return air from said structure;

circulation means coupled to said supply means for effecting circulation of said supply air in said structure;

air flow means coupled to said supply means for measuring a supply air flow rate;

return air sample means coupled to said return means for sampling said return air;

supply air sample means coupled to said supply means for sampling said supply air;

outside air sample means coupled to said supply means for sampling said outside air;

valve means coupled to said return air sample means, said supply air sample means, said outside air sample means and said air sensor means for selecting one of said return air or said supply air or said outside air as air to be sampled;

air sensor means coupled to said valve means for measuring a component of said air to be sampled and producing an output;

control means for directing said valve means to select said outside air and subtracting the output of said air sensor means from a predetermined outside air reference value to produce an offset, directing said valve means to select said return air and storing the sum of said output of said air sensor means and said offset as a return air sensor means output, directing said valve means to select said supply air and storing the sum of said output of said air sensor means and said offset as a supply air sensor means output, determining said flow rate of outside air from the product of said ventilation air flow rate and the ratio of the difference between said return air sensor means output and said supply air sensor means output to the difference between said return air sensor means output and said outside air reference value.

* * * * *

UNITED STATES PATENT AND TRADEMARK OFFICE
CERTIFICATE OF CORRECTION

PATENT NO.   : 5,267,897
DATED        : December 7, 1993
INVENTOR(S)  : Kirk H. Drees It is certified that error appears in the above-indentified patent and that said Letters Patent is hereby corrected as shown below:

Title Page:        Item [75] Inventor: which reads "Kirk A. Drees" should read -- Kirk H. Drees - -;

Signed and Sealed this

Second Day of August, 1994

Attest:

BRUCE LEHMAN

*Attesting Officer*        Commissioner of Patents and Trademarks